United States Patent [19]

Baals et al.

[11] Patent Number: 5,377,261

[45] Date of Patent: Dec. 27, 1994

[54] APPARATUS AND METHOD FOR ACCESSING BOTH LOCAL AND NETWORK-BASED FEATURES AT A TELEPHONE TERMINAL

[75] Inventors: Kimberly A. Baals, Matawan; Edward W. Boakes, Middletown; Kathleen J. Chylinski, Bridgewater; Darren A. Kall, Highland Park; Gary C. Smith, Freehold, all of N.J.

[73] Assignee: AT&T Corp., Murray Hill, N.J.

[21] Appl. No.: 878,085

[22] Filed: May 4, 1992

[51] Int. Cl.⁵ ............................................. H04M 3/42
[52] U.S. Cl. ..................................... 379/201; 379/89; 379/96; 379/110
[58] Field of Search ..................... 379/96, 90, 110, 89, 379/201

[56] References Cited

U.S. PATENT DOCUMENTS

| | | | |
|---|---|---|---|
| 4,680,729 | 7/1987 | Steinhart | 364/900 |
| 4,800,582 | 1/1989 | D'Agosto | 379/355 |
| 4,817,127 | 3/1989 | Chamberlin | 379/110 |
| 4,862,498 | 8/1989 | Reed | 379/355 |
| 4,885,575 | 12/1989 | Williams | 340/712 |
| 4,885,765 | 12/1989 | Shirakawa | 379/96 |
| 4,932,022 | 6/1990 | Keeney | 379/96 |
| 4,949,290 | 8/1990 | Pike | 364/580 |
| 4,969,136 | 11/1990 | Chamberlin | 379/75 |
| 4,975,896 | 12/1990 | D'Agosto | 379/96 |
| 5,128,982 | 7/1992 | Dugdale | 379/89 |
| 5,220,501 | 6/1993 | Lawlor | 379/90 |

*Primary Examiner*—James L. Dwyer
*Assistant Examiner*—Michael N. Lau
*Attorney, Agent, or Firm*—Samuel R. Williamson

[57] ABSTRACT

In a user-interactive display-based telephone terminal, a user of the telephone terminal is provided easy access at the terminal to both local features and network-based features from a telecommunication switch. The user of the terminal reconfigures the terminal to a state wherein network based information is obtained by simply actuating any of the associated network-based keys. Similarly, the user of the telephone terminal reconfigures the terminal to a state wherein local information stored in the terminal is obtained by simply actuating an associated local key. The information selected, local or network-based, is displayed in the same location in an associated display on the terminal. The user of the terminal is therefore not provided with nor is he or she required to have knowledge of the location of a particular feature.

18 Claims, 3 Drawing Sheets

APPARATUS AND METHOD FOR ACCESSING BOTH LOCAL AND NETWORK-BASED FEATURES AT A TELEPHONE TERMINAL

BACKGROUND OF THE INVENTION

1. Technical Field

This invention is directed to interactive display arrangements and more particularly to an apparatus and a method for enabling a user to easily access both local and network-based features through an interactive display arrangement.

2. Description of the Prior Art

Telephone terminals that contain user interactive displays and enable a user to access local and network-based features and also to execute local and network-based commands at the telephone terminal are now becoming popular. In these terminals, the number of features or commands available on a display for selection by the user is limited, at any given time, by the finite size of the display.

Most high function telephone terminals provide buttons and indicators for access to network-based features available from a telecommunication switch. Many of these telephone terminals also provide a display which further describes the feature or other available network-based information. Some telephone terminals also provide local features wherein access to a personal directory on a display or a repertory dialer may be provided, for example. When telephone terminals provide access to both local and network-based features, however, the operation of selecting from one or the other set of displayable features may be confusing to a user. This confusion occurs since often a user is not able to readily determine the particular state (local or network-based) that the telephone terminal is in and then reconfigure the terminal to the other state for accessing its features or to execute a command in this other state.

To minimize the confusing aspects of the display operation, some telephone terminals available in the art are constructed with the display separated into two separate areas. For these terminals, the buttons and a first part of the display are assigned to accessible network-based or switched features while other buttons and a second pan of the display are assigned to accessible local features. Other telephone terminals are constructed with completely separate displays and buttons for accessing the local and network-based features or require the user to consciously switch the display between the local state and the network-based state before being able to access a feature in the switched to state. It is desirable, therefore, that a telephone terminal providing access to both local and network-based features allows a user to be able to easily gain access to and use either of these features without undue confusion.

SUMMARY OF THE INVENTION

The prior an problems are solved in accordance with the present invention by providing a user of a telephone terminal with a method and apparatus for easily accessing both local features and network-based features from a telecommunication switch. In preferred embodiments, the user of the telephone terminal reconfigures the terminal to a state wherein network-based information is obtained by simply actuating any of the associated network-based keys. Similarly, the user of the telephone terminal reconfigures the terminal to a state wherein local information stored in the terminal is obtained by simply actuating an associated local key. The information selected, local or network-based, is displayed in the same location in an associated user interactive display on the terminal. The user of the terminal is therefore not provided with nor is he or she required to have knowledge of the source of a particular feature.

In accordance with one aspect of the invention, the telephone terminal is configured to a normal state wherein access to all local information and network-based information is abandoned by simply actuating an "Exit" key. Actuating the Exit key 1) exits any local menus that are active on the display of the telephone terminal, 2) transmits a code to the network that causes the network to abandon any network-based display feature and 3) returns the display to its normal state (default display mode).

In accordance with another aspect of the invention, the telephone terminal prioritizes the network-based information receivable from the telecommunication switch into high priority messages and low priority messages, hierarchically arranged. In accordance with this aspect of the invention, when the user of the terminal is accessing local information on the display and network-based information is received at the terminal, the terminal replaces the local information in the display with the network-based information when the network-based information is a high priority message. When the received network-based information is a low priority message, however, the local information continues to be displayed in the display.

BRIEF DESCRIPTION OF THE DRAWING

This invention and its mode of operation will be more clearly understood from the following detailed description when read with the appended drawing in which.

DETAILED DESCRIPTION

Figure 1:
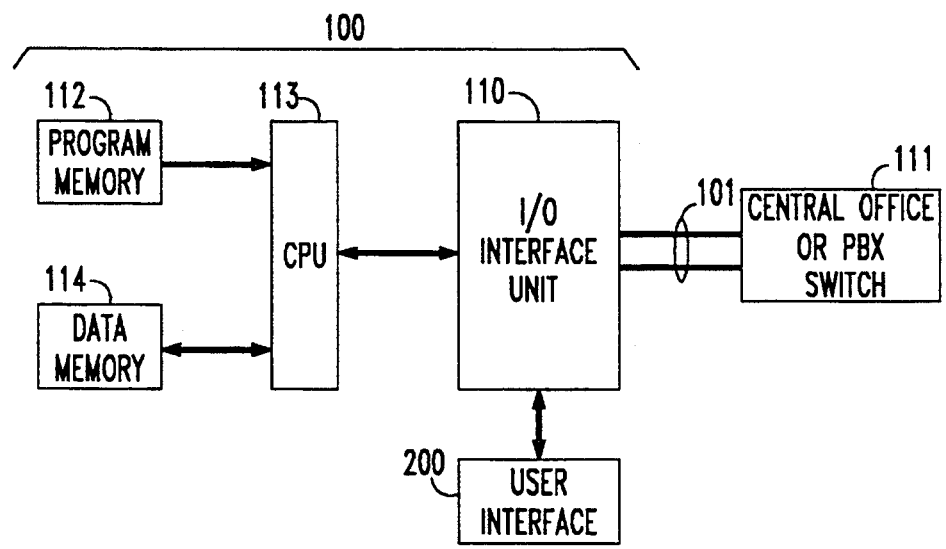
FIG. 1 is a block diagram of a telephone terminal useful in describing the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS ® central office (CO) switch or the DEFINITY ® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
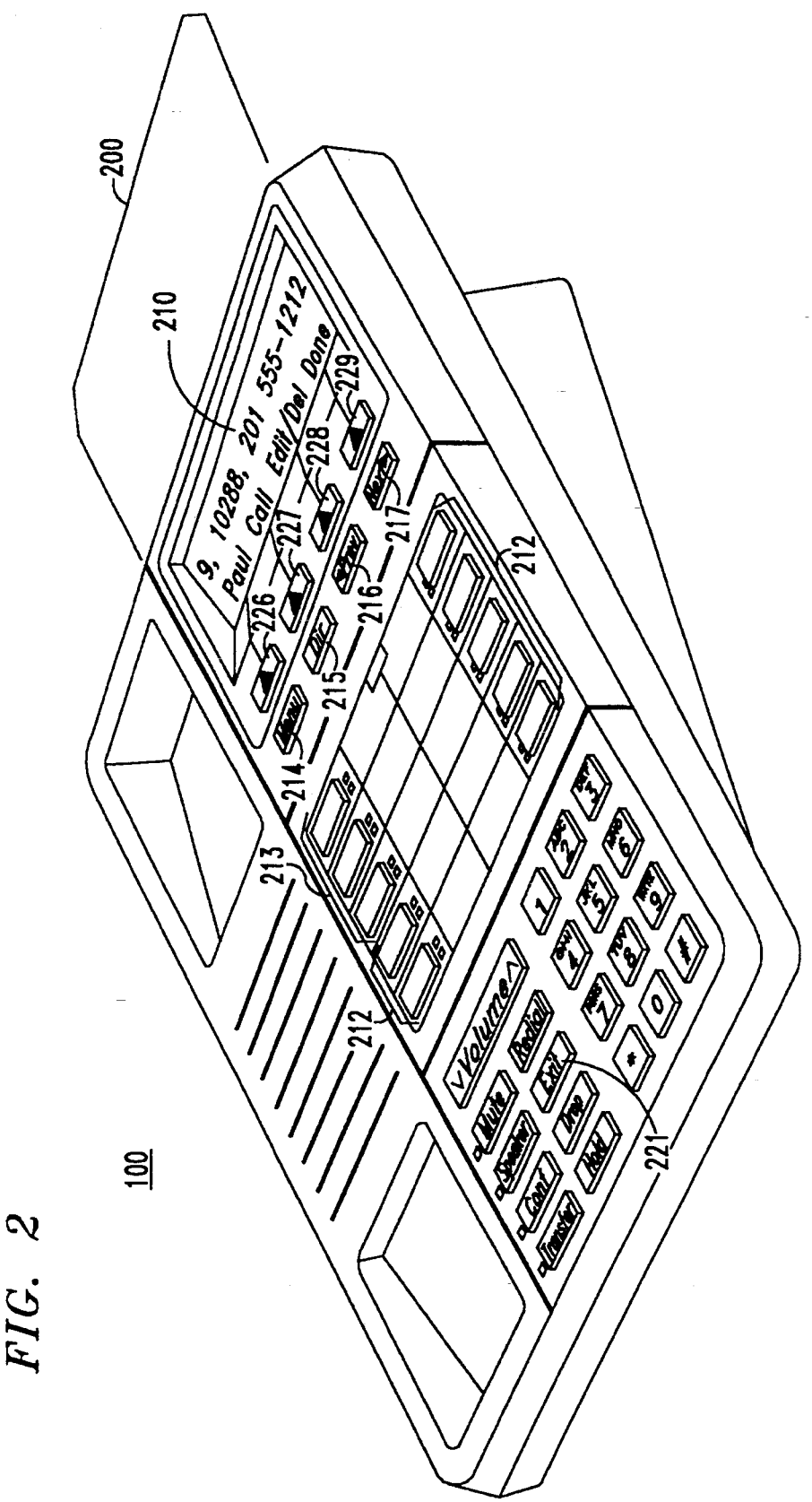
FIG. 2 illustrates the telephone terminal of FIG. 1 including a user interactive display, in accordance with the present invention.

With reference to FIG. 2, and in accordance with the invention, the user interface 200 allows the user of the telephone terminal 100 to access both local features and network-based features using a common display and also associated and common buttons without the need for knowledge of the source for a particular feature.

The user interface 200 comprises a user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state, to be described in greater detail later herein with reference to FIGS. 3 through 6. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the next button 217 could be used in the switch feature state, for example, to display the next entry in the directory query feature.

The labels and functions of the softkeys 226 through 229 appear on the associated display 210. The label or function for each of these keys changes dynamically as the user performs functions and makes selections via these softkeys. Shown in the display 210 is just one entry in the local personal directory of the user. Such entries are stored in both numeric and alphabetic order. The illustrated entry is that of "Paul" who can be reached by dialing 9,10288, (201) 555-1212 or by depressing the softkey 227. Paul's information also may be edited or deleted by depressing the softkey 228. After any desired editing is completed, the terminal is informed of such completion by the user depressing the softkey 229.

While the embodiment of the present invention is described as being incorporated into a telephone terminal, it should be recognized that the present command-operated terminal could be utilized in a computer or other program-controlled system. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2 together with the state diagrams of FIGS. 3,4,5 and 6, which taken together describe the logical steps and the various parameters required to implement the present invention.

Figure 3:
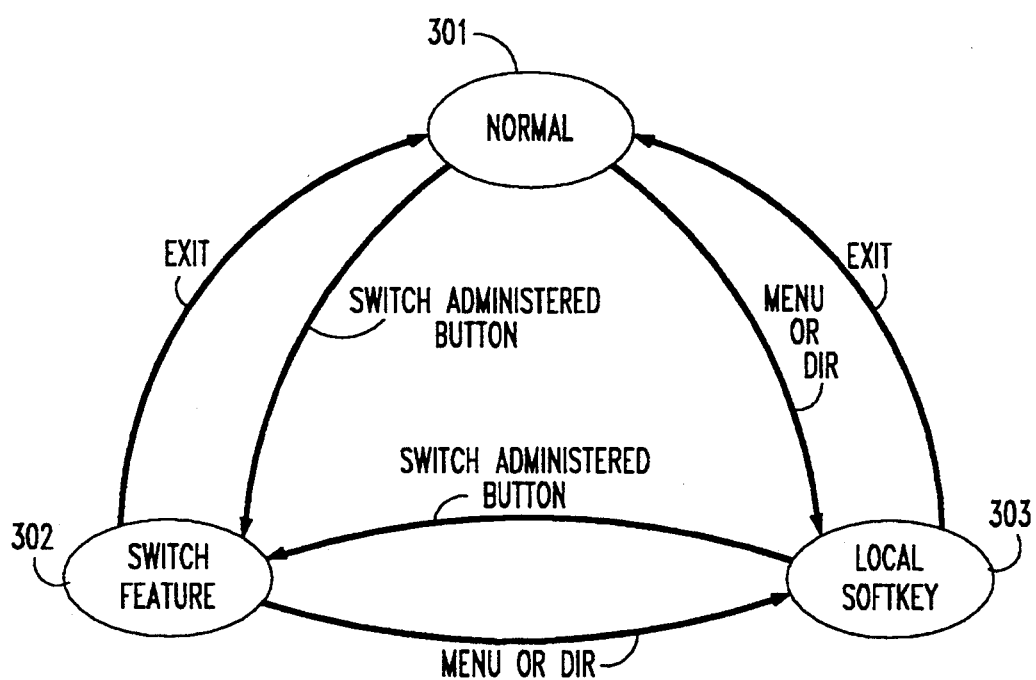
FIG. 3 shows a state diagram illustrating the three information states in which the telephone terminal of FIGS. 1 and 2 may be configured, in accordance with the present invention.

With reference first to FIG. 3, there is shown a state diagram illustrating the three information states in which the telephone terminal 100 may be configured. Information that corresponds to each state is provided in the display 210 of FIG. 2 as each display state is entered.

The display state of the telephone terminal 100 is advantageously arranged to reside in a normal state 301. This is considered the default resting state of the telephone terminal 100 in which the display 210 is simply that of a clock displaying the date and time. From the normal state, the terminal 100 may enter either the switch feature state 302 or the local softkey state 303. In the switch feature state 302, certain features provided by the central office or PBX switch 111 are accessible through actuation of the network-based or switch administered buttons 212, shown in FIG. 2. These include a number of well-known selectable network-based features. The user selects those of the available features that are desired and each of the selected features is assigned to one of the switch administered buttons 212. Some of these network-based features are, for example, call forwarding, automatic call back, directory query, inspect, auto call, leave-word-call, and leave-word-call-cancel. Call appearance buttons 213 also are network-based switched buttons which are used for selecting a line to the switch 111 or for responding to an incoming call on a line from the switch 111. These features are represented by a first set of information codes.

In the local softkey state 303, certain locally selectable features are provided by circuitry contained in the terminal 100. Some of the selectable local softkey features are, for example, a personal directory, in which entries are stored in a numeric and alphabetic order, and a call log, consisting of 1) an unanswered incoming log, 2) an answered incoming log, and 3) an outgoing log. Still other selectable local softkey features include a display contrast adjustment, ring pattern selection, self-test, clock setting and a three digit password lock. These features are represented by a second set of information codes.

Movement between the three states is easy and in a logical manner. By way of example through operation, a user may reconfigure the terminal 100 from the normal state 301 to the local softkey state 303 by depressing the buttons 214 or 215, respectively labeled Menu or Dir, shown on the user interface 200 in FIG. 2. Depressing these buttons 214 and 215 allows the softkey switches 226 through 229 to access local features. To reconfigure the terminal 100 from the switch feature state 302 to the local softkey state 303, again, either of these buttons 214 or 215 is depressed. Thus from either the normal state 301 or the switch feature state 302, a single key stroke of either Menu or Dir is sufficient to reconfigure the terminal 100 to the local softkey state 303.

In order to configure the terminal 100 to the switch feature state 302 from either the normal state 301 or the local softkey state 303, any one of the plurality of switch administered buttons 212 or the call appearance buttons 213 is depressed. The terminal is then configured to the switch feature state 302. The particular network-based feature or command represented by the depressed switch administered button is executed in the switch 111 or a line connection to the switch 111 is established when a call appearance button 213 is depressed. This greatly simplifies a user responding to an incoming telephone call when he or she happens to be in the local softkey state 303. Whenever an incoming call or other high priority message is received from the switch 111 by the terminal 100 while the terminal is in the softkey state, the message from the switch will cause a temporary suspension of the softkey message on the display and in its place insert the message from the switch onto the display. This feature is described in greater detail later herein and with reference to FIGS. 5 and 6.

In order to configure the terminal to the normal state 301 from either the switch feature state 302 or the local softkey state 303, the Exit key or button 221 on the user interface 200 is depressed. The depression of this exit button provides a control signal to the CPU 113, which configures the terminal for the normal state 301, and also provides a default code to the switch 111 abandoning any network-based display feature then being interrogated. Thus all that is necessary is the depression of this exit button regardless of the state that the terminal 100 is in when a user wants to reconfigure the terminal to the normal state 301. The effect of this inventive arrangement is that a user using the terminal 100 is able to activate a network-based operation or perform a local operation without having prior knowledge of the source of that operation, or knowledge of which state that the terminal is residing in before depressing any buttons on the user interface 200 for performing the operation.

Figure 4:
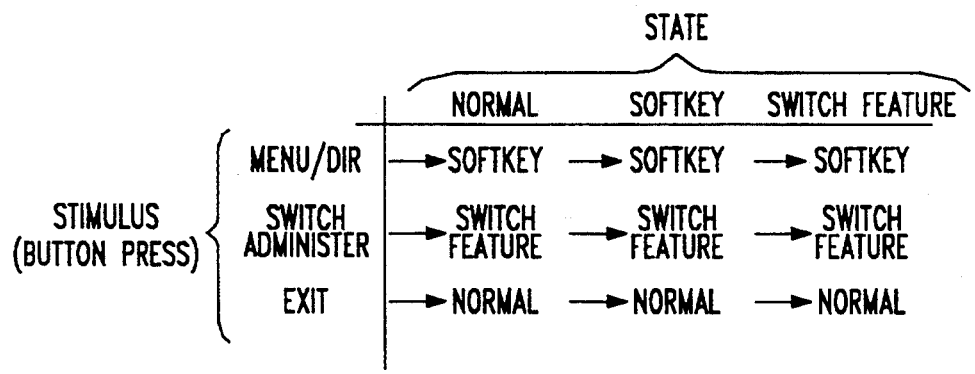
FIG. 4 shows a state diagram depicting the response of the telephone terminal of FIGS. 1 and 2 to stimuli or button depressions by a user, in accordance with the present invention.

Referring next to FIG. 4, there is shown a state diagram depicting the response of the telephone terminal 100 to stimuli or button depressions by a user in a state diagram as in FIG. 3, but arranged somewhat differently from the diagram of FIG. 3. The three states depicted at the top of this state diagram are the same three states shown in FIG. 3, these states being: the normal state; the local softkey state; and the switch feature state. Along the left hand axis of this state diagram are the stimuli, i.e., Menu/Dir, Switch Administer and Exit, that may be provided by the user while the terminal 100 is in any of the indicated states.

When the user of the terminal depresses either the Menu button 214 or the Dir button 215, the state of the terminal either remains in the softkey state or is reconfigured to this state for performing the local operation. When a switch administered button 212 is depressed (and also a call appearance button 213) the state of the terminal 100 either remains or is configured to the switch feature state. Finally, when the Exit button 221 is depressed, the terminal remains in or returns to the normal state. If the terminal is returned to the normal state, as earlier indicated, any feature operation, network or local, being executed is terminated.

Figure 5:
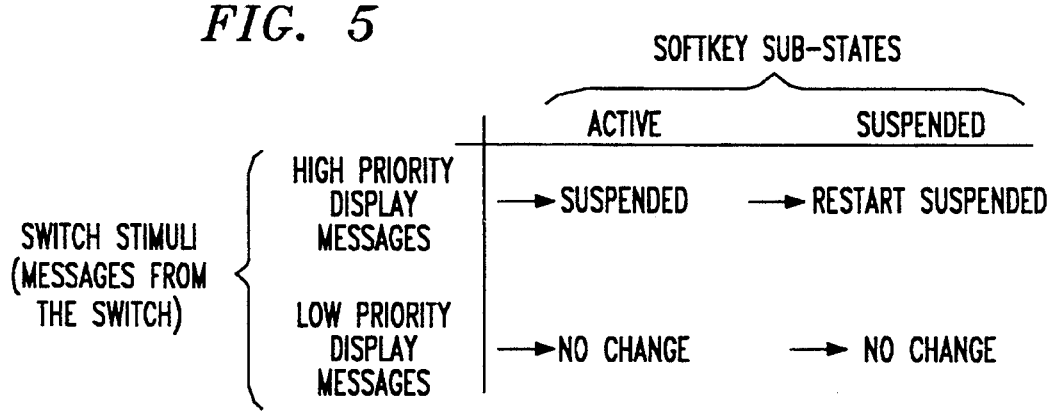
FIG. 5 shows a state diagram for illustrating some of the sub-states of the telephone terminal of FIGS. 1 and 2 and the operation of the terminal while in these sub-states, in accordance with the present invention.

Shown in FIG. 5 is a state diagram for illustrating some of the sub-states of the telephone terminal 100 and the operation of the terminal while in these sub-states, in accordance with the invention. The softkey state shown in FIG. 4 may have many sub-states and the switch feature state, shown in FIG. 4, also may have many sub-states. The number of sub-states is determined by the particular switch feature operation or local softkey operation being executed.

The two states depicted at the top of the state diagram in FIG. 5 are active and suspended softkey sub-states. When the telephone terminal 100 is in the softkey state and is active in that state, i.e., a softkey operation is being executed, the terminal is considered to be in a softkey active sub-state. The terminal is in the softkey state and also in the softkey suspended sub-state when it has been placed in such state as a result of a previously received code representing, for example, a high priority display message. Along the left hand axis of this state diagram are the switch stimuli or category messages that may be provided from the switch while the terminal is in either of the two indicated states. The first of these two categories of messages are the high priority display messages which affect the display by suspending the displayed local message and inserting on the display the message received from the switch. Such a message may be a received code representing an incoming call to the terminal and, if caller ID is available, also the number of the calling party. Also any other message having a code that the terminal categorizes as a high priority message may be displayed.

The second of these two categories of messages are the low priority display messages, or those messages that are not of immediate interest to the user and therefore do not effect the display. An example of a low priority message is a time-out message provided from the switch after network-based information has been provided to the terminal 100. Once the switch 111 sends a code representative of network-based information, it subsequently sends another code after a predetermined period which provides a time-out message in order to reconfigure the terminal and remove the network-based information from the display, assuming that the terminal had been configured to display this feature. With the described arrangement, therefore, the user does not see the low priority message while he or she is in the local softkey state.

By way of operation through an illustrative example, if the terminal is in the active softkey state and a message categorized as a high priority display message arrives at the terminal, the terminal is configured into the suspended state and a timer, available in CPU 113, which determines the length of this suspended state, is activated. The message then being displayed in the display 210 is replaced with the information contained in the switched-based message. If the terminal is already in the suspended state and receives a high priority display message, it remains in the suspended state and the timer is reset to its maximum time. If while the terminal is in the softkey state and is active in that state, it receives a low priority message there is no change in the message provided in the display 210.

If a first and then a second high priority message arrive for display at the terminal 100, certain procedures are executed in determining which of these messages are displayed on the display 210 after the arrival of the second message. Each message available at the switch 111 and received by the terminal 100 is represented by a discrete code. All of the codes from the switch 111 are hierarchically arranged in order of importance in the updatable program memory 112 of terminal 100. Thus, the CPU 113 will cause the first displayed message to continue on the display 210 and also cause an audible alerting message to be provided to the user if the first received message is of a higher priority than the second received message. On the other hand, if the second received message is of a higher priority than the first received message, then this second message will replace the first received and displayed message. When messages are of equal priority, such as incoming calls, the first received message continues to be displayed and an audible alerting signal is given to the user at the terminal 100. The user may then place the first call on hold and actuate a call appearance button, answering the second call in a conventional manner, or, in accordance with the invention, the user may depress the "Next" button 217 on the user interface 200 to determine who this second calling party is without interrupting the ongoing conversation with the first call. In this instance, the user then has the option of answering the second call in the conventional manner or continuing to converse with the party of the first call, thereby allowing a "not available message" to be provided by the switch 111 to the second calling party.

Figure 6:
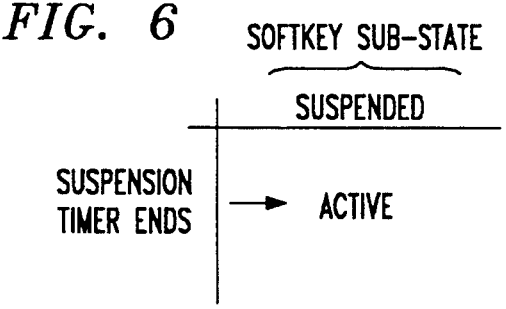
FIG. 6 shows a state diagram for illustrating the operation of a timer in causing the telephone terminal to be configured in the softkey active sub-state illustrated in FIG. 5, in accordance with the present invention.

FIG. 6 is a state diagram for illustrating the operation of the timer in causing the telephone terminal 100 to be reconfigured to the softkey active sub-state of FIG. 5. The suspended state is depicted at the top of this state diagram. Along the left hand axis of this state diagram is the stimulus that sufficient time has elapsed such that the suspension timer ends. When the suspended timer ends, the terminal is reconfigured to the softkey active state wherein the local softkey feature that was previously being accessed is returned to the display 210.

When the terminal 100 is in a softkey suspended state, for example, the terminal remains in the softkey state, but the display of the softkey executions are suspended. What is displayed on the display 210, rather, is the received message from the switch 111. Thus the display 210 provides the user with messages from the switch which, as earlier indicated, might be messages that are indicative of an incoming call to the terminal, or of another message from the switch categorized as a high priority message.

What has been described is merely illustrative of the present invention. Other embodiments known to those skilled in the art could be utilized without departing from the spirit and scope of the present invention. by way of example, the relative importance of the interrupting display may be determined not by just group or category, but may also be determined by the present state of the terminal. In such an arrangement, each terminal state may be considered as an independent evaluator for determining the relative importance of potential interruptions. For example, if the display is in the switch feature state and there is an incoming call, then an automatic-call-back response is assigned a lower priority, and would therefore not interrupt. If an automatic-call-back response is received, then an incoming call is assigned a lower priority, and would therefore not interrupt the display. Additionally, other applications to telephone, computer or other user interactive systems other than the disclosed system are contemplated as being within the knowledge of one skilled in the art.

We claim:

1. A method of accessing both local features stored in a telephone terminal and network-based features available at a telecommunication switch connected to the telephone terminal, the method comprising the steps of:

receiving at the telephone terminal a first set of information codes representative of the network-based features, each one of said first set of information codes being accessible in response to actuating an associated network-based switch;

generating in the telephone terminal a second set of information codes representative of the local features, each one of said second set of information codes being accessible in response to actuating an associated local switch; and displaying in a display device a selected one of the information codes from either the first set of information codes or the second set of information codes responsive to a single actuation of the respectively associated switch, said selected information code being displayed at the same location in the display device irrespective of the set from which the displayed information code is selected.

2. The method of claim 1 wherein said display device includes a softkey menu for selecting additional codes from either said first set of information codes or said second set of information codes for display.

3. The method of claim 1 further comprising the step of generating the first set of information codes representative of the network-based features, each one of said first set of information codes being accessible in response to actuating an associated network-based switch.

4. The method of claim 3 further comprising the step of generating a default code for terminating the execution of all accessed information codes in both the first set of information codes and the second set of information codes, the default code being accessible in response to actuating an associated switch.

5. The method of claim 4 wherein the associated switch for accessing the default code is an exit button.

6. An apparatus for accessing both local features stored in a telephone terminal and network-based features available at a telecommunication switch connected to the telephone terminal, the apparatus comprising:

means for receiving at the telephone terminal a first set of information codes representative of the network based features, each one of said first set of information codes being accessible in response to actuating an associated network-based switch on the telephone terminal;

means for generating in the telephone terminal a second set of information codes representative of said local features, each one of said second set of information codes being accessible in response to actuating an associated local switch on the telephone terminal;

means for displaying a selected one of the information codes from either the first set of information codes or the second set of information codes responsive to a single actuation of the respectively associated switch, said selected information code appearing in said display means at the same location irrespective of which set of information codes is selected.

7. The apparatus of claim 6 wherein said display means includes a softkey menu for selecting additional codes from either said first set of information codes or said second set of information codes for display.

8. The apparatus of claim 6 further comprising means for generating at the telephone terminal the first set of information codes representative of the network based features, each one of said first set of information codes being accessible in response to actuating an associated network-based switch on the telephone terminal.

9. The apparatus of claim 8 further comprising means for generating a default code for terminating the execution of all accessed information codes in both the first set of information codes and the second set of information codes, the default code being accessible in response to actuating an associated switch on the telephone terminal.

10. The apparatus of claim 9 wherein the associated switch on the telephone terminal for accessing the default code is an exit button.

11. An apparatus for accessing both local features stored in a telephone terminal and network-based features available at a telecommunication switch connected to the telephone terminal, the apparatus comprising:
means for receiving at the telephone terminal a first set of information codes representative of the network based features, each one of the first set of information codes being hierarchically arranged into a first group of high priority display messages and a second group of low priority display messages;
means for generating in the telephone terminal a second set of information codes representative of said local features, each one of said second set of information codes being accessible in response to actuating an associated local switch on the telephone terminal;
means for displaying a selected one of the information codes from either the first set of information codes or the second set of information codes, the displaying means selecting for display one of the first set of information codes in the first group of high priority display messages when both said high priority message has been received by said receiving means and one of said second set of information codes has been selected for display.

12. The apparatus of claim 11 wherein said displaying means selects for display the one of said second set of information codes when simultaneously one of the first set of information codes in the second group of low priority display messages has been received by said receiving means and said one of said second set of information codes has been selected for display.

13. The apparatus of claim 11 wherein said displaying means selects for display the received information code in the first group of high priority display messages for a predetermined time period after receipt of said code, upon the expiration of this time period, the displaying means selects for display said one of said second set of information codes.

14. The apparatus of claim 13 wherein said displaying means, responsive to receipt by the receiving means of a first one of the first set of information codes in the first group of high priority display messages and a second one of the first set of information codes in the first group of high priority display messages, selects for display the received information code in the first group of high priority display messages having the highest hierarchical order.

15. The apparatus of claim 14 wherein information reflective of said selected information code appears in said displaying means at the same location irrespective of which set of information codes is selected.

16. The apparatus of claim 15 wherein the displaying means further include selecting means for identifying the information code containing the appropriate information for display.

17. The apparatus of claim 15 wherein the second set of information codes representative of said local features are hierarchically arranged in a group of ordered importance from a least important information code to a most important information code.

18. The apparatus of claim 17 wherein the means for displaying a selected one of the information codes from either the first set of information codes or the second set of information codes further comprises ordering means, the ordering means selecting for display the one of the information codes having the level of highest ordered importance.

* * * * *